(No Model.)

W. HOCHHAUSEN.
ELECTRIC MOTOR.

No. 374,871. Patented Dec. 13, 1887.

Witnesses:

Inventor:
Wm Hochhausen
By his Attorney:

United States Patent Office.

WILLIAM HOCHHAUSEN, OF NEW YORK, N. Y.

ELECTRIC MOTOR.

SPECIFICATION forming part of Letters Patent No. 374,871, dated December 13, 1887.

Application filed June 21, 1883. Serial No. 98,737. (No model.)

*To all whom it may concern:*

Be it known that I, WILLIAM HOCHHAUSEN, a citizen of the United States, and a resident of New York, in the county of New York and State of New York, have invented certain new and useful Improvements in Electric Motors, of which the following is a specification.

My invention relates to electric motors and to the means for regulating the speed thereof with the commutator.

My invention consists in the combination, with the electric motor, of an automatic variable resistance arranged in a branch of the main circuit and responding to changes in the speed of movement of the motor, so that with an increase of speed the amount of resistance in the branch will be varied to cause less current to flow in the motor, while, vice versa, if the speed be decreased the resistance will effect a division of current such as to cause more current to flow into the motor.

Figure 1:
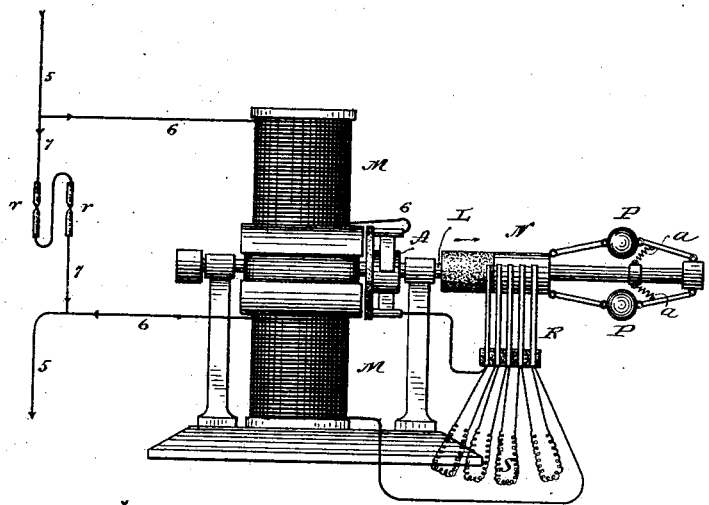
Figure 2:
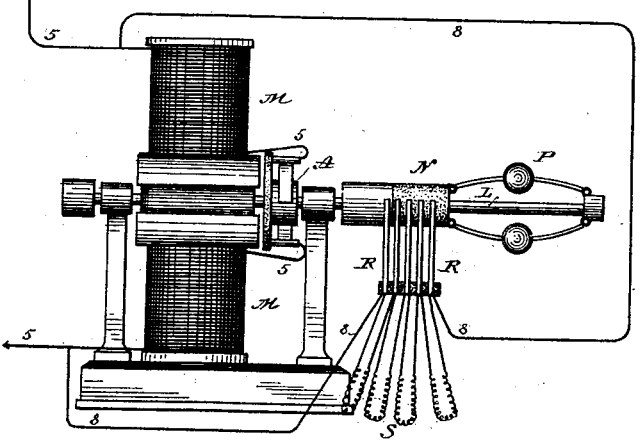

In the accompanying drawings, Figure 1 is a side view of a motor, showing the automatic variable resistance. Fig. 2 shows a modified arrangement of the variable resistance with relation to the motor and the main circuit.

In Fig. 1, M M indicate the field-magnets of the electric motor, and L the armature shaft of the same. A indicates the commutator-cylinder.

Upon shaft L is a sleeve, N, applied thereto in any suitable manner, so as to be revolved with the shaft, but at the same time to be capable of longitudinal movement on the shaft. The sleeve is connected with the links of a speed-governor of ordinary construction, the balls or weights of which are indicated at P. Suitable springs, *a a*, tend to hold the parts in the position shown. With an increase of speed of the motor the sleeve N will be carried in the direction of the arrow by the movement outward of the governor-balls P.

The sleeve N is made in two parts—one of conducting and the other of non-conducting material—while upon said sleeve rest a series of contact-brushes, R, connected with a series of artificial resistances, S, the whole forming a variable resistance of well-known principle, in which the amount of resistance in the circuit will depend upon the number of brushes R resting on the conducting portion of the sleeve N. When all the brushes are on the conducting portion of the sleeve, the resistance coils S are all short-circuited; but as the speed of revolution of the armature increases sleeve N is drawn to the right, thus gradually bringing in the resistance S. The motor is here shown as connected in a branch, 6, from a main conductor, 5, another branch, 7 7, from which includes electric lights *r* or other working resistances. The branch 6 passes through the field-magnets M and the armature, but includes the brushes R and one or more of the resistance-coils S, according to the position of the sleeve N. If the speed of the motor increase or tend to increase beyond normal, more of the resistances S will be thrown into the branch 6, thus diverting current into branch 7, so as to tend to reduce the speed of the motor.

In Fig. 2 the resistances S and the brushes R are included in a wire, 8, forming a branch around the motor, the latter being included in the main conductor 5. In this case the two branches are, first, the branch 8, containing the resistances, and, second, the conductor containing the motor. The position of the conducting and non-conducting portions of the sleeve N are, however, reversed, so that normally all of the resistances S are included in the branch 8 and very little current will be diverted from the motor; but with an increase in the speed of the motor the resistance is automatically lessened, so that more current will flow in branch 8 and less in the motor branch. The effect will be, as before, to keep the speed of the motor constant.

I do not limit myself to any particular form of variable resistance, nor to any particular mechanical device for imparting a movement to the adjusting devices of the resistance correspondently with the changes of speed in the motor.

What I claim as my invention is—

1. The combination, with an electric motor, of an automatic variable resistance forming a branch around the motor through which current may be variably diverted to determine the strength of the same and responsive to changes in the speed of said motor, whereby the speed of the same may be kept constant with a given line-current despite changes in the load.

2. The combination, with an electric motor, of a variable resistance placed in a branch around the motor or a portion thereof, and forming the path of current diverted from the motor in increasing amount as the speed of the motor increases, whereby the speed of the motor may be kept constant, as and for the purpose described.

3. The combination of an electric motor, an adjustable resistance in a branch of the circuit from which said motor is supplied for controlling the flow of current in the motor, said branch being connected at its terminals to the main circuit on either side of the motor and between the same and the generator, and a mechanical speed-governor operated by the motor for adjusting said resistance.

4. The combination, with an electric motor, of a longitudinally-adjustable sleeve or cylinder revolved by said motor and provided at different portions of its length with conducting and non-conducting material, and a series of brushes resting on said sleeve and connected with artificial resistances, as and for the purpose described.

5. The combination of the motor, the sleeve N, of conducting and non-conducting material, longitudinally adjustable on the motor-shaft, a ball or other governor connected with the sleeve and rotated by the motor, and an adjustable resistance having contact-springs or brushes bearing on the sleeve.

6. The combination, substantially as described, with an electric motor, of an artificial resistance in a branch whose terminals are connected to the main circuit at points between the motor and the generator, as and for the purpose described, and mechanism for adjusting said resistance operating in response to changes in the speed of the motor.

Signed at New York, in the county of New York and State of New York, this 12th day of June, A. D. 1883.

WILLIAM HOCHHAUSEN.

Witnesses:
   THOS. TOOMEY,
   M. M. FRIEND.